United States Patent [19]
LoRusso et al.

[11] Patent Number: 4,974,566
[45] Date of Patent: Dec. 4, 1990

[54] OPTIMAL SWIRL GENERATION BY VALVE CONTROL

[75] Inventors: Julian A. LoRusso, Woodhaven; George C. Davis, Ann Arbor; Charles E. Newman, Jr., Flat Rock, all of Mich.

[73] Assignee: Ford Motor Company, Dearborn, Mich.

[21] Appl. No.: 413,643

[22] Filed: Sep. 28, 1989

[51] Int. Cl.$^5$ .............................................. F02B 31/00
[52] U.S. Cl. ...................................... 123/308; 123/432
[58] Field of Search ...................... 123/432, 308, 90.16, 123/193 CH

[56] References Cited

U.S. PATENT DOCUMENTS

| | | | |
|---|---|---|---|
| 3,993,037 | 11/1976 | Mukai et al. | 123/432 |
| 4,285,310 | 8/1981 | Takizawa et al. | 123/308 |
| 4,572,114 | 2/1986 | Sickler | 123/90.13 |
| 4,794,506 | 1/1985 | Hayama et al. | 123/348 |
| 4,805,569 | 2/1989 | Suzumura et al. | 123/308 |
| 4,840,147 | 6/1989 | Tanahashi et al. | 123/432 |

OTHER PUBLICATIONS

SAE Paper No. 880388, entitled "Variable Valve Timing-A Possibility to Control Engine Load Without Throttle", by H. P. Lenz and K. Wichart, Dated Feb. 29-Mar. 4, 1988.

SAE Paper No. 880602, entitled "An Integrated, Full Authority, Electrohydraulic Engine Valve and Diesel Fuel Injection System", by J. E. Mardell and R. K. Cross, dated Feb. 29-Mar. 4, 1988.

Primary Examiner—E. Rollins Cross
Attorney, Agent, or Firm—Allan J. Lippa; Peter Abolins

[57] ABSTRACT

An intake valve lift control system for optimizing both rotational movement and inducted flow of a mixture inducted into the chambers of an internal combustion engine. The combustion chamber includes a mask partially surrounding the intake valve seat thereby imparting rotational movement to the inducted mixture. During light load engine operating conditions, maximum valve lift displacement is limited to the height of the mask such that rotational movement of the inducted mixture is maximized during the entire intake stroke of the intake valve. During heavy load engine operating conditions in which optimal flow is desire, maximum valve lift displacement is extended beyond the mask such that flow, rather than rotational movement, is optimized. Commencement of valve lift is also delayed during normal engine operations such that rotational movement of the inducted mixture is further optimized.

13 Claims, 9 Drawing Sheets

OPTIMAL SWIRL GENERATION BY VALVE CONTROL

BACKGROUND OF THE INVENTION

The field of the invention relates to generating swirl and/or tumble in a mixture inducted into the combustion chamber of an internal combustion engine.

It is desirable to increase the rotational movement of a mixture inducted into an internal combustion engine for increasing the burn rate thereby improving combustion efficiency. This phenomenon has been used to enable an increase exhaust gas recirculation and thereby achieve a reduction in emissions of nitrogen oxides. For gasoline engines, the inducted mixture is air/fuel and recirculated gas. In the case of diesel engines, the inducted mixture is air and recirculated gas. In either case, the strategy is to optimize angular momentum flux of the inducted mixture such that turbulence, and therefore mixing, continues after the intake valve is closed.

Angular momentum may be increased by generating a swirl pattern of the inducted mixture wherein the rotational velocity field has a center axis in line with the bore axis of the combustion chamber. Tumble may also be used to increase angular momentum by generating a tumble pattern of the inducted mixture wherein the rotational velocity field has a center axis normal to the bore axis of the combustion chamber.

A common approach for increasing swirl of the inducted measure is to extend a mask from the cylinder head partially surrounding the intake valve. During the portion of the valve intake stroke wherein the valve does not clear the mask, the inducted mixture is partially blocked by the mask such that the mixture is directed into a swirl pattern. During the portion of the intake valve stroke in which the valve seat clears the mask, inducted flow is far less restricted resulting in substantially less swirl.

A problem with conventional approaches of masking the intake valve is that neither swirl nor the volume of inducted flow per unit of time are maximized. That is, substantial swirl is only generated during the portion of the intake stroke in which the valve seat remains below the mask. And, inducted flow is only optimized, to the extent permitted by the mask, when the valve seat clears the mask. Even during maximum valve lift, inducted flow suffers some restriction from the mask.

U.S. Pat. No. 4,285,310 issued to Takizawa et al addresses only one of the two problems discussed above. More specifically, the Takizawa et al patent addresses the problem of a limitation on maximum inducted flow resulting from a mask or similar restriction. The Takizawa et al patent does not appear to address the problem of less than optimal swirl being generated. More specifically, the Takizawa et al patent provides both a primary and secondary intake valve. The primary valve appears to be conventional and is partially surrounded by a shroud for producing swirl. The secondary valve, which is a variable lift valve, lacks the shroud for producing a swirl. The secondary valve remains closed during light load conditions and opens only during heavy engine load conditions for increasing inducted flow. Allegedly, during heavy load conditions, inducted flow is optimized by action of the secondary valve. A disadvantage of this approach is that swirl does not appear to be optimized. Stated another way, during light load conditions, substantial swirl appears to be generated only during the portion of the valve stroke in which the primary valve remains below the mask. Another disadvantage is the added complexity of auxiliary valve and associated driving mechanisms.

SUMMARY OF THE INVENTION

An object of the present invention is to optimize volume of flow per unit of time of a combustible mixture inducted into a combustion chamber and optimize rotational movement of the combustible mixture within the combustion chamber.

The above problems and disadvantages are overcome, and object achieved, by an intake valve control system which controls both rotation movement and flow of a mixture inducted into the combustion chamber of an internal combustion engine, comprising: a cylinder head forming a top portion of the combustion chamber, the cylinder head having an intake valve opening formed therein for receiving the inducted mixture of air and fuel; an intake valve coupled to the cylinder head for sealing and unsealing the valve opening; displacement means coupled to the intake valve for providing axial movement of the valve as a function of engine angular position, the displacement means providing at least a first maximum axial displacement and a second maximum axial displacement in response to respective first and second displacement commands, the displacement means commencing the axial displacement in response to the displacement commands; a mask coupled to the cylinder head partially surrounding the valve opening for providing swirl to the inducted mixture, the mask providing optimal swirl when the intake valve is limited in displacement to the first maximum axial displacement; and control means responsive to engine operating parameters for providing the first displacement command to maximize flow of the mixture during first predetermined engine operating conditions and for providing the second displacement command to maximum swirl of the mixture during second predetermined engine operating conditions. Preferably, the first displacement command is provided at an engine rotational position delayed from the second displacement command.

The above aspect of the invention provides the advantage of optimizing rotational movement of the inducted mixture during the entire intake stroke of the intake valve when it is limited to the first maximum axial displacement. Another advantage provided by the above aspect of the invention is that flow of the inducted mixture is optimized when the intake valve stroke is limited to the second maximum axial displacement. Another advantage is that angular rotation of the inducted mixture is further optimized by delay commencement of the valve stroke in response to the first displacement command. Stated another way, a greater vacuum is created in the combustion chamber, and greater piston speed developed, to further optimize rotational movement by delaying commencement of valve lift with respect to commencement of valve lift under conditions when an optimal flow, rather than a highly increased rotational movement, is desired.

DESCRIPTION OF THE DRAWINGS

The object and advantages described above will be better understood by reading a description of an example of an embodiment, referred to below as the preferred embodiment, with reference to the drawings wherein.

DESCRIPTION OF THE PREFERRED EMBODIMENT

Figure 1:
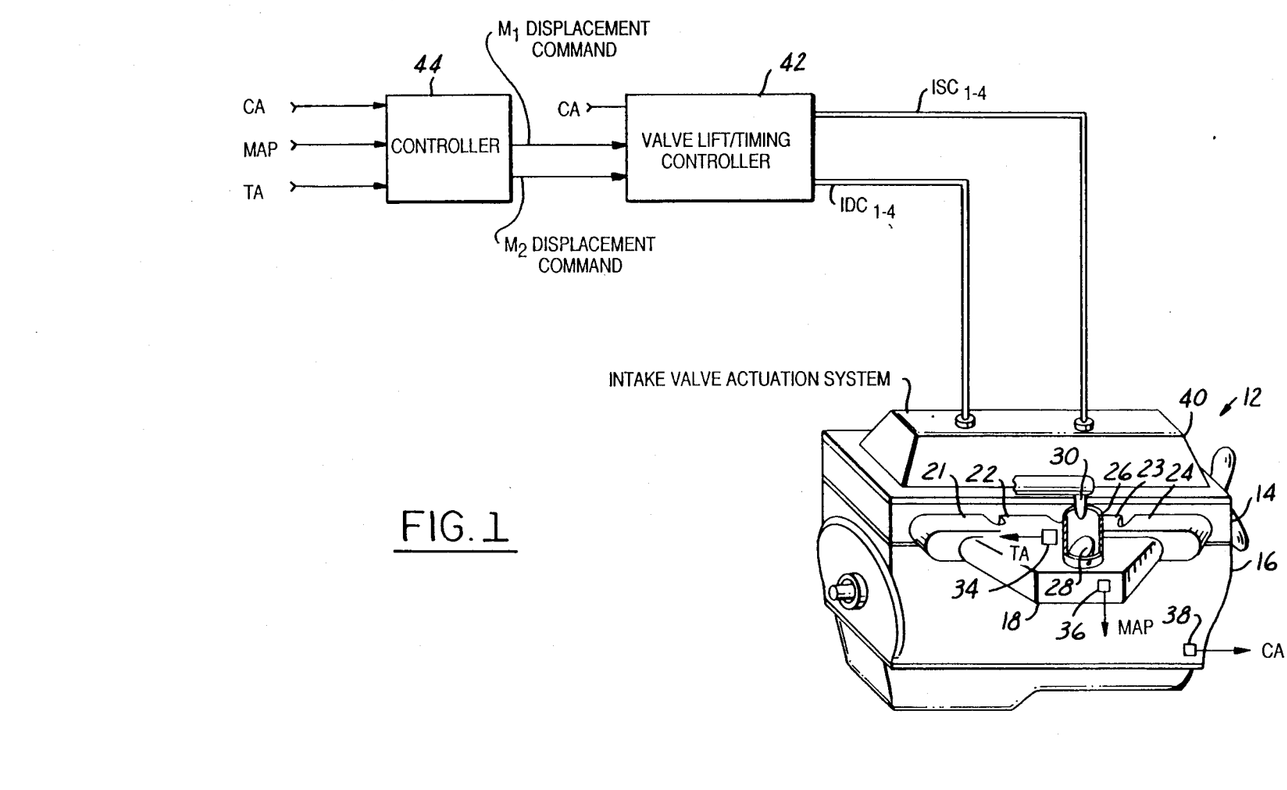
FIG. 1 is a block diagram of an embodiment in which the invention is used to advantage.

Referring first to FIG. 1, internal combustion engine 12 is shown including cylinder head 14 coupled to engine block 16. Intake manifold 18 is shown having runners 21, 22, 23, and 24 coupled to respective combustion chambers 1, 2, 3 and 4 (FIG. 9A) via cylinder head 14. Air/fuel intake 26, having conventional throttle plate 28 positioned therein and coupled to fuel injector 30, is shown connected to intake manifold 18 for providing an air/fuel mixture to the combustion chambers.

Conventional sensors are shown coupled to engine 12 for providing measurements of various engine operating parameters. In this particular example, throttle angle sensor 34 provides signal TA related to the throttle position of throttle plate 28. Manifold pressure sensor 36 is shown coupled to intake manifold 18 for providing signal MAP related to the manifold pressure therein. Crank angle sensor 38 is coupled to the engine crankshaft (not shown) for providing signal CA related to angular position of the crankshaft.

It is noted that other conventional engine components such as a fuel delivery system, ignition system, engine controller, and exhaust manifold are not shown in FIG. 1 because they are well known and not necessary for an understanding of the invention. It is also noted that various lift displacement may be used to throttle the vengine in which case throttle plate 28 would not be needed.

As described in greater detail later herein with particular reference to FIGS. 2–11, intake valve actuation system 40 controls the lift displacement profile and lift timing of intake valves $IV_1$, $IV_2$, $IV_3$, and $IV_4$. Intake valve actuation system 40 is responsive to inlet supply command signals $ISC_{1-4}$ and intake drain command signals $IDC_{1-4}$ from valve lift/timing controller 42. Maximum valve lift displacement is determined by maximum displacement command signals from controller 44 in response to signal MAP, signal TA, and signal CA. In general terms, which are described in greater detail later herein, intake valve actuation system 40 provides for at least one of two maximum valve lift displacements ($M_1$ or $M_2$ as shown in FIG. 7) dependent upon either the $M_1$ displacement command or the $M_2$ displacement command from controller 44. For example, during high load conditions as determined by controller 44 from signal MAP, maximum valve displacement $M_2$ is provided by valve lift/timing controller 42 such that each intake valve clears the cylinder head mask 224 (see FIG. 6A). In this manner, maximum volume of flow per unit of time of the inducted mixture is provided. During normal operating conditions, as determined by controller 44, peak lift displacement is limited to maximum valve $M_1$ such that each intake valve does not clear mask 224 thereby maximizing rotational movement (swirl or tumble) of the inducted mixture (see FIGS. 8A and 9B).

Figure 2:
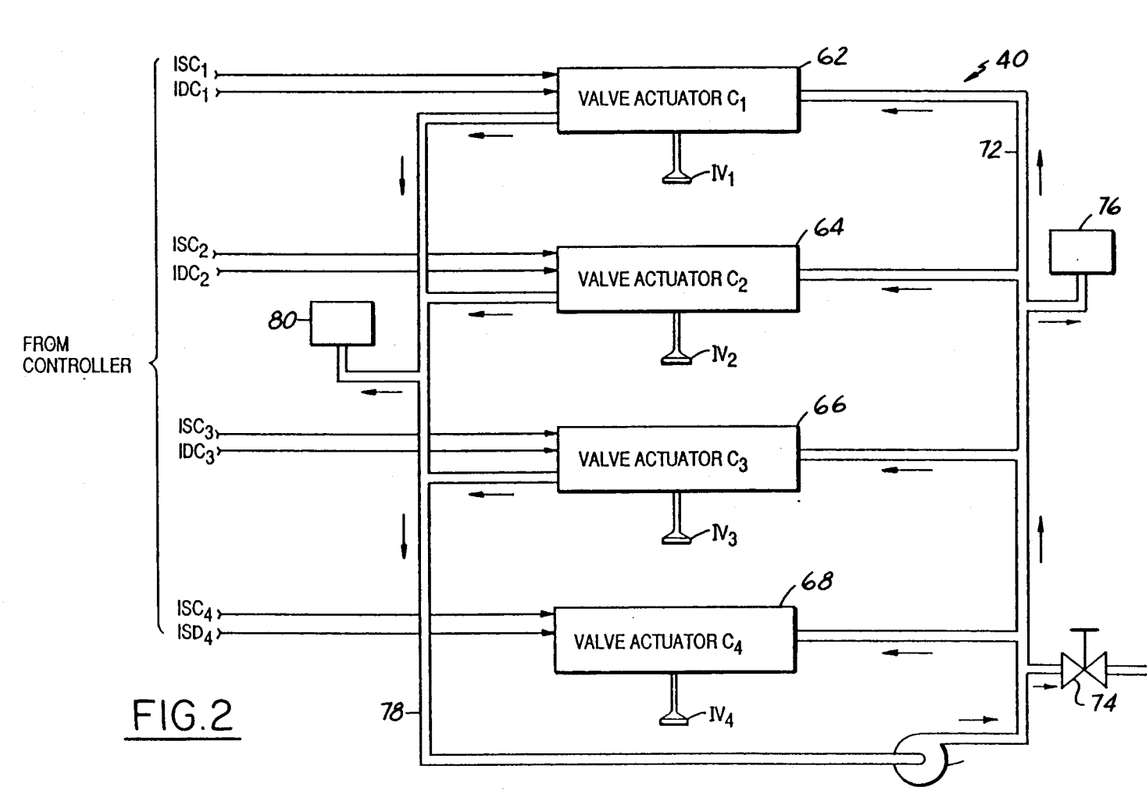
FIG. 2 is a block diagram of an intake valve actuation system shown in FIG. 1.

Referring to FIG. 2, a block diagram of one example of intake valve actuation system 40 is shown including valve actuator assemblies 62, 64, 66, and 68 connected to respective engine intake or inlet valves $IV_1$, $IV_2$, $IV_3$, and $IV_4$. Variable displacement pump 70 is shown supplying pressurized hydraulic fluid to the intake valve actuator assemblies via supply line 72. Conventional relief valve 74 and high pressure accumulator 76 are also shown coupled to supply line 72. Pump 70 is shown receiving hydraulic fluid from the intake valve actuator assemblies via return line 78. Low pressure accumulator 80 is shown coupled to return line 78. As described in greater detail later herein, intake valve actuator assembly 62 is responsive to intake supply command $ISC_1$ and intake drain command signal $IDC_1$ from valve lift/timing controller 58. Similarly, valve actuator assemblies 64, 66, and 68 are responsive to respective command signals $ISC_2$, $IDC_2$, $ISC_3$, $IDC_3$, $ISC_4$, and $IDC_4$.

Figure 3:
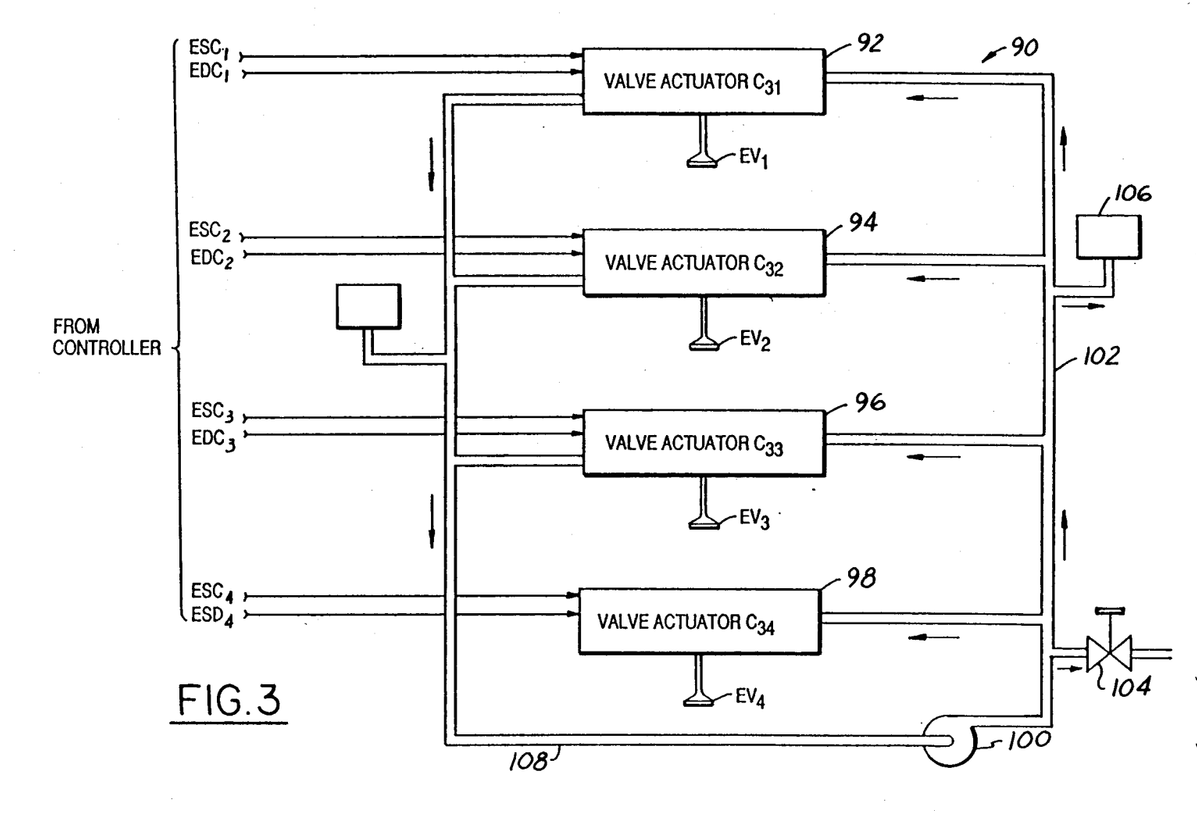
FIG. 3 is a block diagram of an exhaust valve actuation system coupled to the embodiment shown in FIG. 1.

An optional exhaust valve actuation system 90 is shown in FIG. 3 having the same structure and operation as intake valve actuation system 70 which was previously described with reference to FIG. 2. Valve actuator assemblies 92, 94, 96, and 98 are shown connected to respective engine exhaust valves $EV_1$, $EV_2$, $EV_3$, and $EV_4$. Valve actuation assemblies 92, 94, 96, and 98 are responsive to respective command signals $ESC_1$, $EDC_1$, $ESC_2$, $EDC_2$, $ESC_3$, $EDC_3$, $ESC_4$, and $EDC_4$. Pump 100 is coupled to each valve actuator via supply line 102 and return line 108. Supply line 102 is coupled to high pressure accumulator 106 and vent 104. Return line 108 is shown coupled to each valve actuator assembly and also coupled to low pressure accumulator 110.

Figure 4:
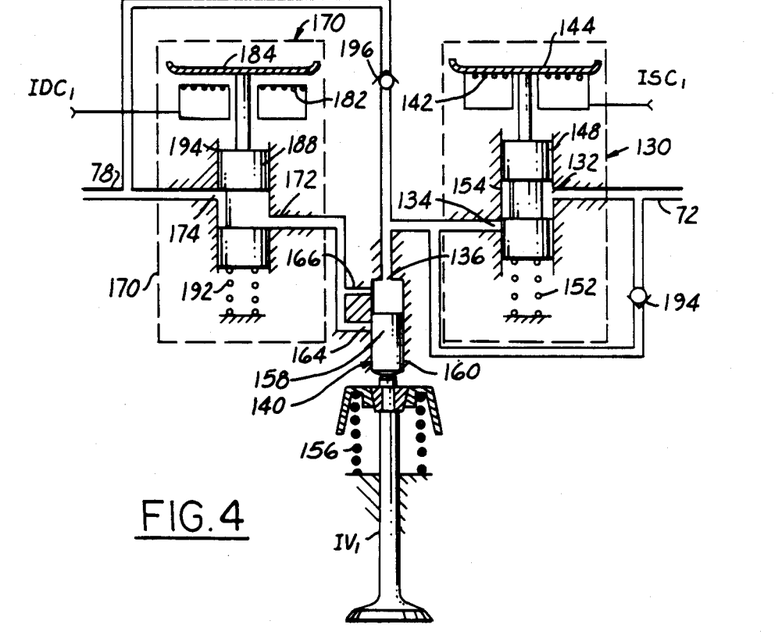
FIG. 4 illustrates a portion of the valve actuation system shown in FIG. 3 which is referred to as a valve actuation assembly.

Referring to FIG. 4, the structure and operation of the valve actuators is now described. Although a single valve actuator (62) is shown, the related description is applicable to valve actuators 64, 66, 68, 92, 94, 96 and 98. Valve actuator assembly 62 is shown including supply valve 130, hydraulic actuator 140, and drain valve 170. Supply valve 130, shown in this example as initially being in its closed position, includes fluid input 132 coupled to hydraulic supply line 72 and fluid output 134 coupled to fluid input 136 of hydraulic actuator 140. Supply valve 130 includes coils 142 responsive to intake supply command $ISC_1$ and electromagnetically coupled to armature 144. Spool valve 148 is shown coupled to both armature 144 and return spring 152 within casing 154. Accordingly, hydraulic supply line 72 is coupled to hydraulic actuator 140 when $ISC_1$ is not active.

Intake valve $IV_1$ is shown coupled between hydraulic actuator 140 and return spring 156. Hydraulic actuator 140 is shown including piston 158 positioned within chamber 160 and coupled to intake valve $IV_1$. Drain outlet 164 is shown coupled to chamber 160 downstream (with respect to piston stroke) of restricted drain outlet 166. Both drain outlet 164 and restricted drain outlet 166 are shown coupled to fluid input 172 of drain valve 170.

For the particular example presented in FIG. 4, drain valve 170 is shown in its normally open position. Fluid outlet 174 of drain valve 170 is shown coupled to hydraulic return line 78. Drain valve 170 is shown including coils 182 responsive to intake drain command $IDC_1$ and electromagnetically coupled to armature 184. Spool valve 188 is shown coupled to both armature 184 and return spring 192 within casing 194. Hydraulic actuator 140 is coupled to hydraulic return line 78 through drain valve 170 when intake drain command $IDC_1$ is not active.

As described in greater detail later herein with particular reference to FIG. 5, supply check valve 194 is shown coupled between hydraulic supply line 72 and fluid inlet 136 of hydraulic actuator 140 for energy recovery purposes. Drain check valve 196 is shown coupled between hydraulic return line 78 and fluid inlet 136 of hydraulic actuator 140 to prevent chamfering.

Figure 5:
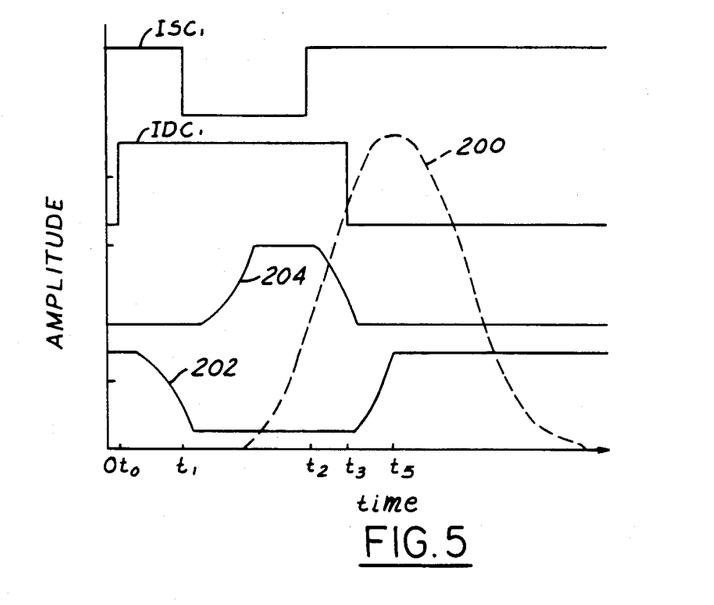
FIG. 5 graphically illustrates the operation of the valve actuation system during full valve lift conditions.

Operation of valve actuator assembly 62 is now described with continuing reference to FIG. 4 and reference to the waveforms shown in FIG. 5. It is noted that although operation is described with reference to intake valve actuator 62, the operation described herein is equally applicable to valve actuators 64, 66, and 68. In this particular example, the relative timing and pulse width of command signals $ISC_1$ and $IDC_1$ are provided by valve lift/timing controller 42 in response to the $M_2$ displacement command from controller 44 (FIG. 1) for achieving the valve lift profile shown by dashed line 200 in FIG. 5. It is noted that in this example peak valve lift is limited to maximum lift displacement $M_1$. More specifically, command signal $IDC_1$ is shown becoming active at time $t_0$. In response, drain valve 170 moves from its normally open position to a closed position as shown by line 202. At time $t_1$, intake supply command $ISC_1$ changes to an inactive state for opening normally closed supply valve 144 as shown by line 204. As supply valve 130 opens, pressure builds in chamber 160 of hydraulic actuator 140 pushing down piston 158 and intake valve $IV_1$. Intake supply command $ISC_1$ changes back to its active state at time $t_2$ thereby isolating chamber 160 from hydraulic supply line 72. However, intake valve $IV_1$ continues its downward motion due to inertia thereby reducing pressure in chamber 160 below the pressure in hydraulic return line 78. In response, return check valve 196 opens enabling hydraulic fluid to enter chamber 160 from hydraulic return line 78 to reduce any potential fluid cavitation.

At time $t_3$ intake drain command $IDC_1$ is shown changing to an inactive state for opening normally open drain valve 170 as shown by line 202. The opening of drain valve 170 is timed to approximately correspond with peak excursion of intake valve $IV_1$. As intake valve $IV_1$ moves towards a rest position by action of return spring 156, its motion is restrained by action of the corresponding pressure accumulation in chamber 160. This pressure accumulation, and resulting restraining force, is increased as piston 158 moves past drain opening 164 towards restricted drain opening 166 in chamber 160. Accordingly, a desired lift return profile (line 200) is obtained by judicious selection of both drain opening 164 and restricted drain opening 166 rather than by reliance only on the spring force of return spring 156 as is the case with prior approaches. Stated another way, drain opening 164 and restricted drain opening 166 are utilized as damping orifices for damping return motion of intake valve $IV_1$ in a desired manner.

Figure 6:
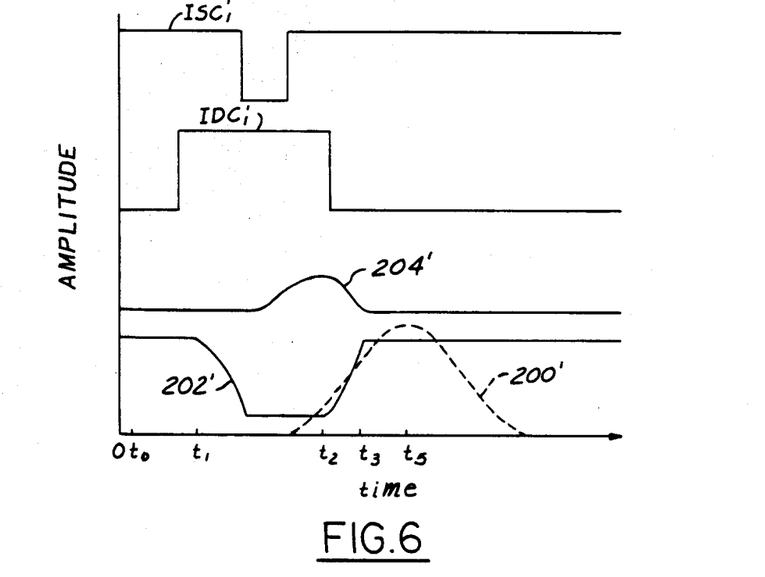
FIG. 6 graphically illustrates operation of the valve actuation system with a maximum lift displacement less than that shown in FIG. 6.
Figure 7:
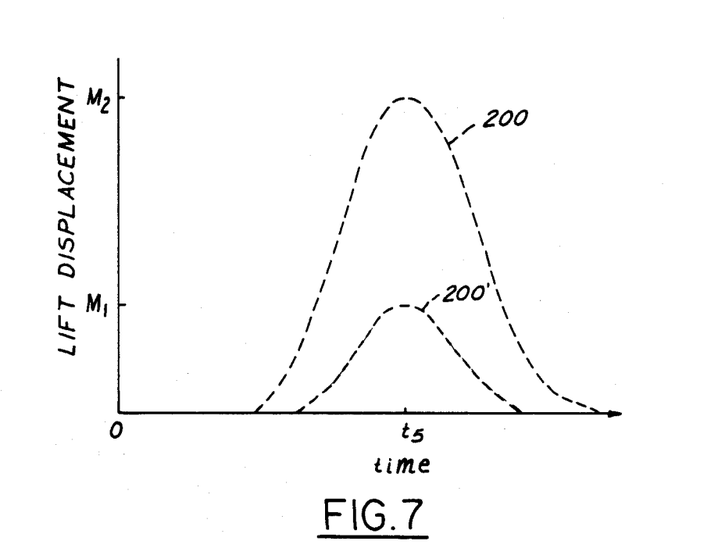
FIG. 7 graphically superimposes the intake valve lift profiles shown in FIGS. 5 and 6.

Referring to FIG. 6, wherein like numerals refer to like representations shown in FIG. 5, an example of operation is presented for achieving a reduction in maximum valve displacement to $M_2$. In this particular example, valve lift (200') is centered at approximately the same timing position as the full lift operation shown by line 200 in FIG. 5, but peak valve displacement is limited to $M_2$. Intake supply command $ISC_1'$ and intake drain command $IDC_1'$ are shown delayed in time and reduced in pulse width from the operation schematically shown in FIG. 5. The resulting operation of supply valve 130 and drain valve 170, are shown by respective lines 204' and 202' in FIG. 6. In response to the depicted operation of supply valve 130 and drain valve 170, the operation of valve actuator 62 proceeds in a similar manner to that previously described herein with particular reference to FIG. 5 for achieving the reduced lift profile shown by line 200' in FIG. 6.

Although an electronically actuated, hydraulic actuation system 40 is shown in this example, those skilled in the art will recognize that other valve actuation systems which provide a variable valve lift may be used to advantage. For example, such a system is disclosed in U.S. Pat. No. 4,572,114 issued to Sickler and still another system is disclosed in SAE Paper 880602, entitled "An Integrated, Full Authority, Electrohydraulic Engine Valve and Diesel Injection Fuel System", by J. E. Mardell and R. K. Cross, dated Feb. 29, 1988. Still another system is disclosed in SAE Paper 880388, entitled "Variable Valve Timing—A Possibility to Control Engine Load Without Throttle", by H. P. Lenz and K. Wichart, dated Feb. 29, 1988.

Referring now to FIG. 7, valve lift profiles 200 and 200' are shown superimposed. It is noted that the maximum lift displacement of profile 200' is designated as $M_1$ and the maximum lift displacement of profile 200 is designated as $M_2$. In this particular example, both maximum lift displacements occur at approximately time $t_5$ which is at the mid-point of intake valve stroke. FIG. 7 also illustrates that valve lift profile 200' commences at a later time than valve lift profile 200, by operation of intake valve actuation system 40, such that a greater vacuum is created in the combustion chamber. An increase in inducted mixture flow is thereby provided for enhancing the swirl effect. It is further noted that valve lift profile 200, and the corresponding maximum lift displacement $M_2$, substantially correspond to a conventional internal combustion engine.

Figure 8A:
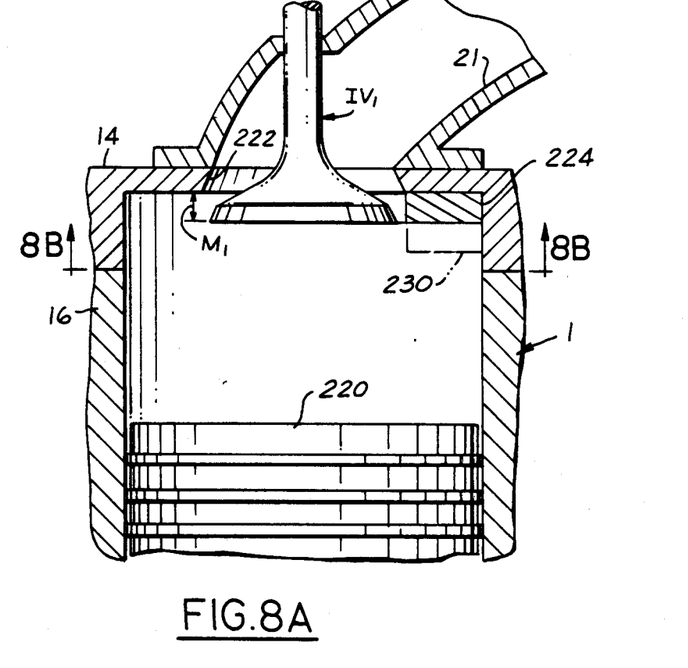
FIG. 8A is a partially broken away view of a combustion chamber showing a maximum intake valve lift configured to optimize swirl.
Figure 8B:
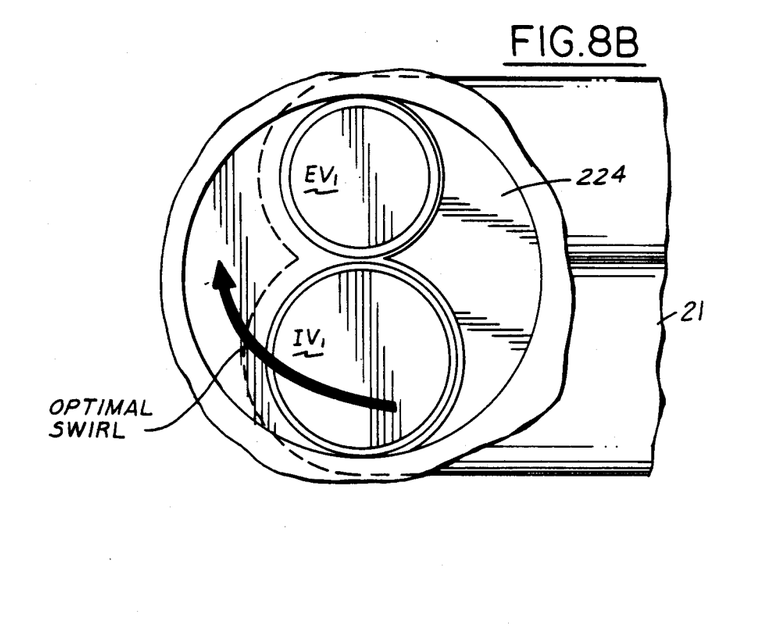
FIG. 8B is a top planar view of the combustion chamber shown in FIG. 8A.

Reference is now made to the cross-sectional and top views of combustion chamber 1 shown in respective FIGS. 8A and 8B. Although only single combustion chamber 1 is shown in this example, it is understood that the following description is equally applicable to combustion chambers 2, 3 and 4, or any other number of combustion chambers in an internal combustion engine. Combustion chamber 1 is shown as a chamber within cylinder head 14 and engine block 16. Conventional piston 220 is positioned within combustion chamber 1 and connected in a conventional manner to the engine crankshaft (not shown) by a conventional piston rod assembly (not shown). Cylinder head 14 is shown having valve seat 222 formed therein communicating with runner 21 of intake manifold 18. Mask 224 is shown downwardly extending from cylinder head 14 and partially surrounding valve seal 222.

For the particular example shown in FIGS. 8A and 8B, valve $IV_1$ is limited in maximum lift displacement to $M_1$. Accordingly, during its entire intake stroke, valve $IV_1$ never clears mask 224 such that swirl of the inducted air/fuel mixture is always optimized. Stated another way, mask 222 provides a partial restriction to the inducted mixture flow during the entire intake stroke of valve $IV_1$ for optimizing swirl during the entire intake stroke. Further, commencement of lift is delayed during the intake stroke as shown in FIG. 7 (line 200' versus line 200). Thus a greater vacuum is created in the combustion chambers, and greater piston speed developed, thereby enhancing swirl when intake valve $IV_1$ opens.

Figure 9A:
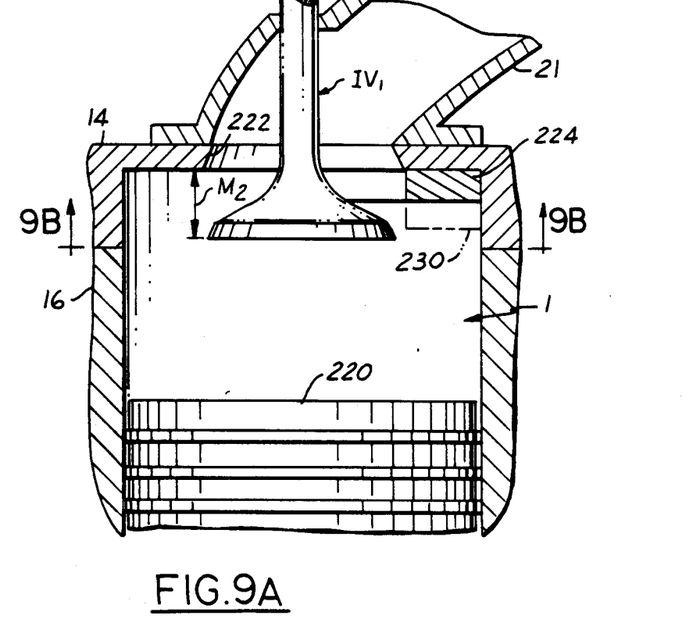
FIG. 9A is a partially broken away view of a combustion chamber illustrating a maximum valve lift displacement for optimizing volume of inducted flow per unit of time rather than swirl.
Figure 9B:
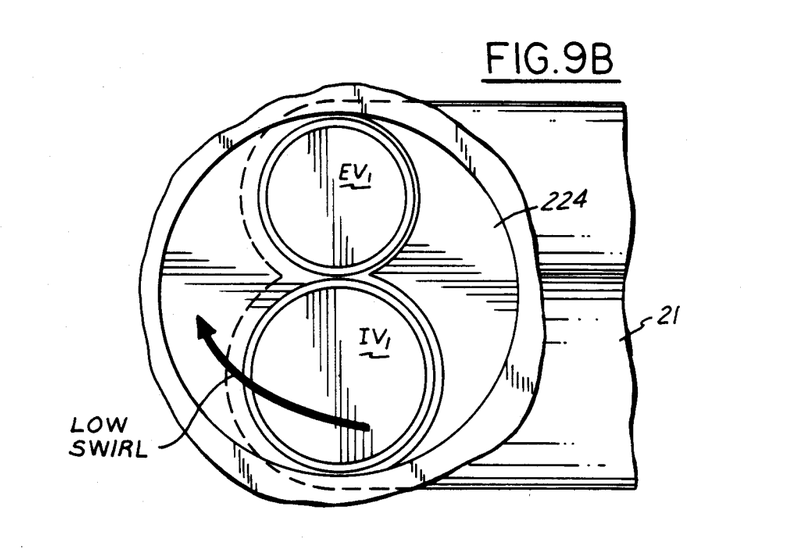
FIG. 9B is a top planar view taken along lines 9B—9B in FIG. 9A.

Referring now to FIGS. 9A and 9B, wherein like numerals refer to like parts shown in FIGS. 8A and 8B, an illustration of combustion chamber 1 is shown wherein valve $IV_1$ is limited in maximum lift displacement to $M_2$. In this particular example, maximum lift displacement $M_2$ is selected such that valve $IV_1$ sufficiently clears mask 224 to optimize flow, rather than swirl, of the inducted mixture. Controller 44 (FIG. 1) commands maximum lift displacement $M_2$ during heavy engine load operating conditions as determined from signal MAP, or during abrupt acceleration conditions as determined from signal TA. Those skilled in the art will also recognize that controller 44 may also provide an intermediate displacement between $M_1$ and $M_2$ for intermediate engine loads.

It is noted that in this particular example, maximum lift displacement $M_2$ is substantially equivalent to the maximum lift displacement in conventional internal combustion engines. However, mask 224 is shown having substantially less extension into the combustion chamber than a conventional mask. Dashed line 230 in FIG. 9A represents the location of a conventional mask. This reduction in mask profile is possible because the present invention limits maximum lift displacement to $M_1$ (FIG. 8A) during the majority of light load engine operation such that optimal swirl is always present. During heavy load engine operations wherein maximum flow is desired, maximum lift displacement is extended to $M_2$ thereby providing a greater inducted flow than heretofore possible. Those skilled in the art will also recognize that the invention could be used to advantage with a conventional mask and a maximum lift displacement greater than $M_2$ for clearing the mask.

In summary, during light load engine operation, the invention provides optimal swirl over the entire intake stroke of valve $IV_1$ (FIG. 8A). During heavy load engine operating conditions wherein maximum flow is desired, the lower profile mask and/or extended maximum lift ($M_2$) provide greater inducted flow than heretofore possible.

Figure 10A:
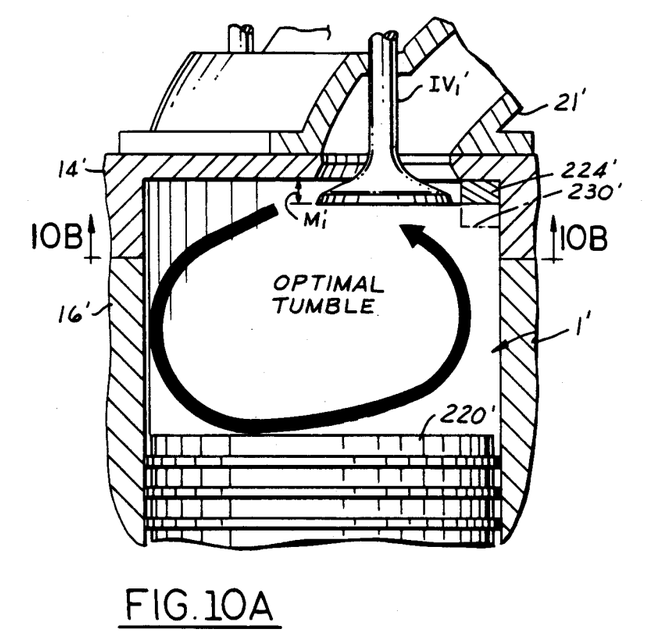
FIG. 10A is a partially broken away view of a combustion chamber having multiple intake valves and illustrates operation of the intake valves wherein maximum lift displacement is limited for optimizing tumble.
Figure 10B:
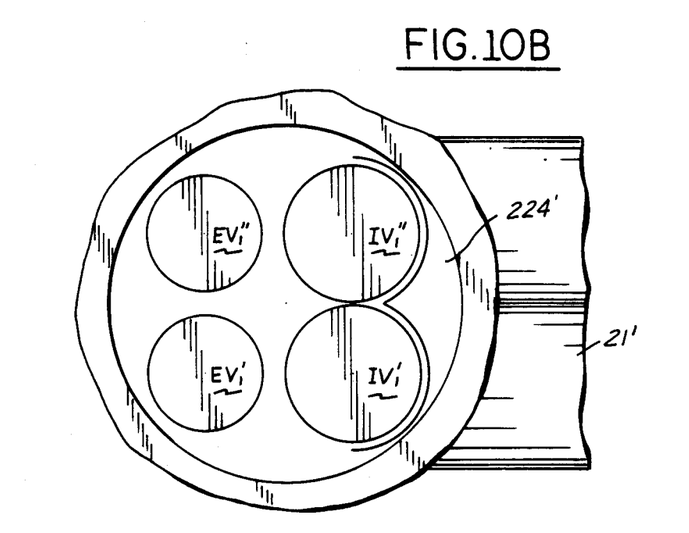
FIG. 10B is a top planar view taken along line 10B—10B in FIG. 10A.

An alternate embodiment in which the invention is used to advantage is shown in FIGS. 10A, 10B, 11A, and 11B wherein like numerals refer to like parts shown in FIGS. 1-9. In this particular example, a four valve per cylinder engine is shown having intake valves $IV_1'$ and $IV_1''$ which operate concurrently. Referring first to FIGS. 10A and and 10B, intake valves $IV_1'$ $IV_1''$ are limited to a maximum lift displacement $M_1'$ during normal engine operating conditions. Accordingly, mask 224' restricts inducted flow during the entire intake stroke of the valves such that inducted flow optimally tumbles into combustion chamber 1' as illustrated in FIG. 10A. That is, optimal angular rotation of the inducted air/fuel mixture is provided during the entire intake stroke of valves $IV_1'$ and/or $IV_1''$.

Figure 11A:
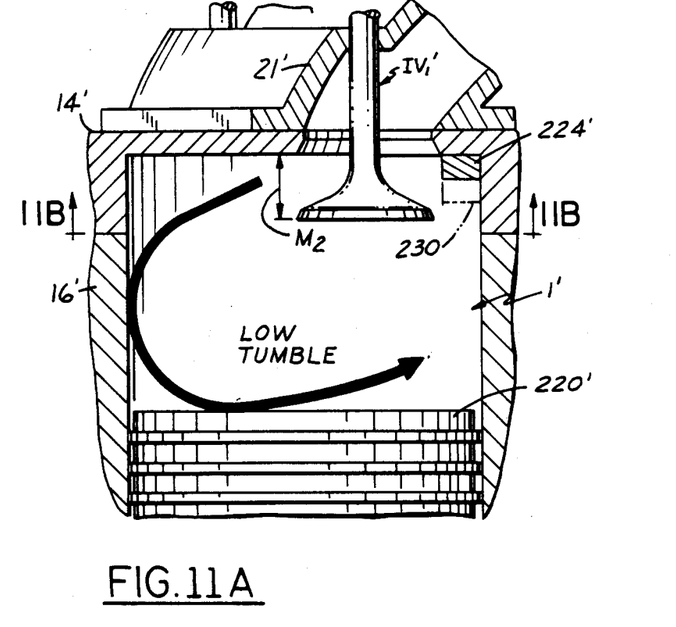
FIG. 11A is a partially broken away view of a combustion chamber having multiple intake valves wherein maximum lift displacement is configured for optimizing volume of inducted flow per unit of time rather than tumble.
Figure 11B:
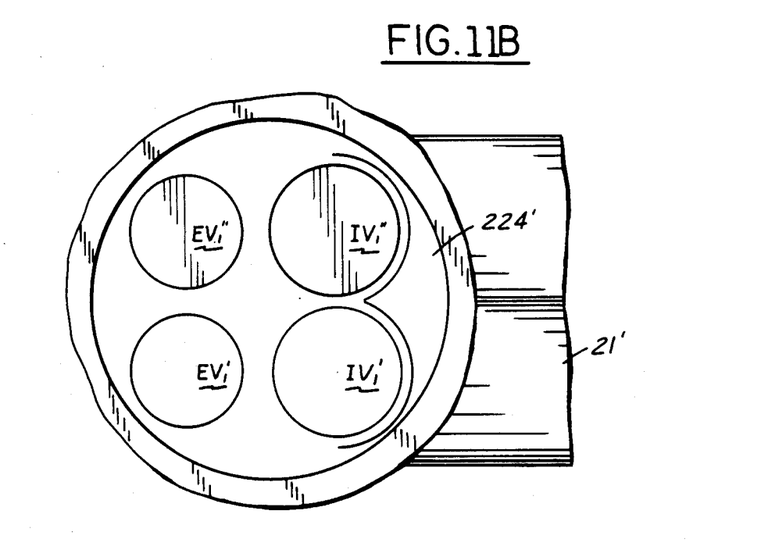

Referring to FIGS. 11A and 11B, intake valves $IV_1'$ and $IV_1''$ are shown limited to maximum lift displacement $M_2''$ during engine operations requiring optimal inducted flow. In this example, the valves clear mask 224' such that inducted flow is optimized. Thus, the invention described herein may be used to advantage for obtaining optimal angular rotation of an inducted mixture in any type of internal combustion engine.

This concludes the description of the preferred embodiment. The reading of it by those skilled in the art will bring to mind many modifications and alterations without departing from the spirit and scope of the invention. Accordingly, it is intended that the invention be limited only by the following claims.

What is claimed:

1. An apparatus for controlling volume of flow per unit of time of a combustible mixture inducted into a combustion chamber of an internal combustion engine and also controlling rotational movement of the combustible mixture within the combustion chamber, comprising:

a cylinder head forming a top portion of the combustion chamber, said cylinder head having an intake valve opening formed therein for receiving the combustible mixture;

an intake valve coupled to said cylinder head for sealing and unsealing said valve opening;

a mask downwardly extending from said cylinder head a predetermined height and partially surrounding said valve opening;

displacement means coupled to said intake valve for axially displacing said intake valve through a profile having a peak axial displacement which is provided in response to a control means; and said control means being coupled to said displacement means and responsive to engine operating parameters for limiting said peak axial displacement to a first maximum axial displacement no greater than said predetermined height of said mask for optimizing rotational movement of the combustible mixture, said control means also extending said peak axial displacement to a second maximum axial displacement beyond said peak height for optimizing flow rate of the combustible mixture in response to said engine operating parameters.

2. The apparatus recited in claim 1 wherein said engine operating parameters are related to engine load.

3. The apparatus recited in claim 1 wherein said control means extends said peak axial displacement to said second maximum axial displacement when said engine load is above a predetermined value.

4. An apparatus for controlling volume of flow per unit of time of a combustible mixture inducted into the combustion chamber of an internal combustion engine and controlling rotational movement of the combustible mixture in the combustion chamber, comprising:

a cylinder head forming a top portion of the combustion chamber, said cylinder head having an intake valve opening formed therein for receiving the combustible mixture;

an intake valve coupled to said cylinder head for sealing and unsealing said valve opening;

displacement means coupled to said valve for providing axial displacement of said valve, said displacement means limiting peak valve displacement to at least a first maximum axial displacement and a second maximum axial displacement in response to respective first and second displacement commands;

a mask coupled to said cylinder head partially surrounding said valve opening for providing the rotational movement to the combustible mixture, said mask providing optimal rotational movement when said valve is limited in peak displacement to said first maximum axial displacement and enabling optimal flow rate when said valve is displaced to said second maximum displacement; and control means responsive to engine operating parameters for providing said first displacement command during first predetermined engine operating conditions and for providing said second displacement command during second predetermined engine operating conditions.

5. The apparatus recited in claim 4 wherein said displacement means commences axial displacement of said valve in response to said first displacement command at a time delayed from commencement of axial displacement of said valve in response to said second displacement command for further optimizing rotational movement.

6. The apparatus recited in claim 4 wherein said first predetermined engine operating conditions comprise heavy load conditions.

7. The apparatus recited in claim 4 wherein said displacement means include a plurality of electronically responsive hydraulic actuators coupled to each of said valves.

8. An apparatus for controlling flow rate of a combustible mixture inducted into a combustion chamber of an internal combustion engine and also controlling rotational movement of the combustible mixture within the combustion chamber, comprising:

a cylinder head forming a top portion of the combustion chamber, said cylinder head having an intake valve opening formed therein for receiving the combustible mixture;

an intake valve coupled to said cylinder head for sealing and unsealing said valve opening;

a mask downwardly extending from said cylinder head a predetermined height and partially surrounding said valve opening;

displacement means coupled to said intake valve for providing axial displacement of said valve; said displacement means limiting peak valve displacement to a first maximum axial displacement no greater than said predetermined height for optimizing the rotational movement of the combustible mixture in response to a first displacement command, said displacement means providing at least a second maximum axial displacement to extend peak valve displacement beyond said predetermined height for optimizing the flow rate of the combustible mixture in response to a second displacement command; and control means responsive to engine operating parameters for providing said first displacement command during first predetermined engine operating conditions and providing said second displacement command in response to second engine operating conditions.

9. The apparatus recited in claim 8 wherein said displacement means commences axial displacement of said valve in response to said first displacement command at a time delayed from commencement of axial displacement of said valve in response to said second displacement command.

10. The apparatus recited in claim 8 wherein said first predetermined engine operating conditions comprise heavy load conditions.

11. An apparatus for controlling flow rate of a combustible mixture inducted into a combustion chamber of an internal combustion engine and also controlling rotational movement of the combustible mixture within the combustion chamber, comprising:

a cylinder head forming a top portion of the combustion chamber, said cylinder head having an intake valve opening formed therein for receiving the combustible mixture;

an intake valve coupled to said cylinder head for sealing and unsealing said valve opening;

a mask downwardly extending from said cylinder head a predetermined height and partially surrounding said valve opening;

displacement means including an electronically responsive hydraulic actuator coupled to said intake valve for providing axial displacement of said valve; said displacement means limiting peak valve displacement to a first maximum axial displacement no greater than said predetermined height for optimizing the rotational movement of the combustible mixture in response to a first displacement command, said displacement means providing at least a second maximum axial displacement to extend peak valve displacement beyond said predetermined height for optimizing the flow rate of the combustible mixture in response to a second displacement command; and control means responsive to engine operating parameters for providing said first displacement command during first predetermined engine operating conditions and providing said second displacement command in response to second engine operating conditions.

12. The apparatus recited in claim 11 wherein said hydraulic actuator comprises: a hydraulically actuated piston coupled to said valve; and an electronically actuated drain valve coupled between said hydraulically actuated piston and a source of hydraulic fluid.

13. The apparatus recited in claim 12 further comprising an electronically actuated supply valve coupled between said hydraulically actuated piston and said source of hydraulic fluid.

* * * * *